Oct. 22, 1935.  E. J. GRANT  2,017,900
COMBINATION MAGNETIC COMPASS AND LEVEL INDICATOR
Filed July 6, 1932  2 Sheets-Sheet 1
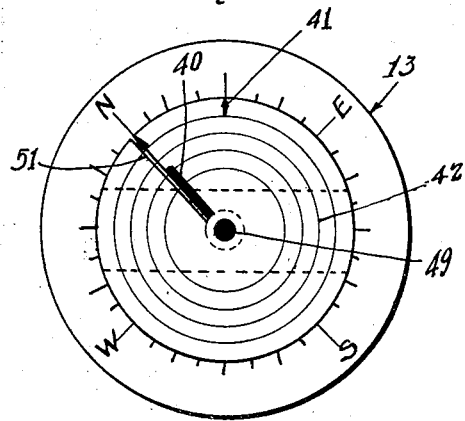
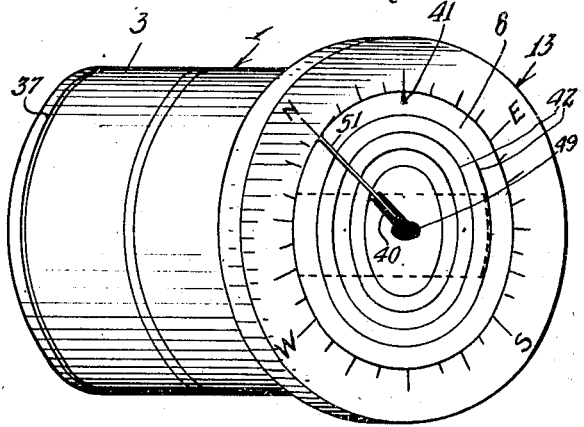
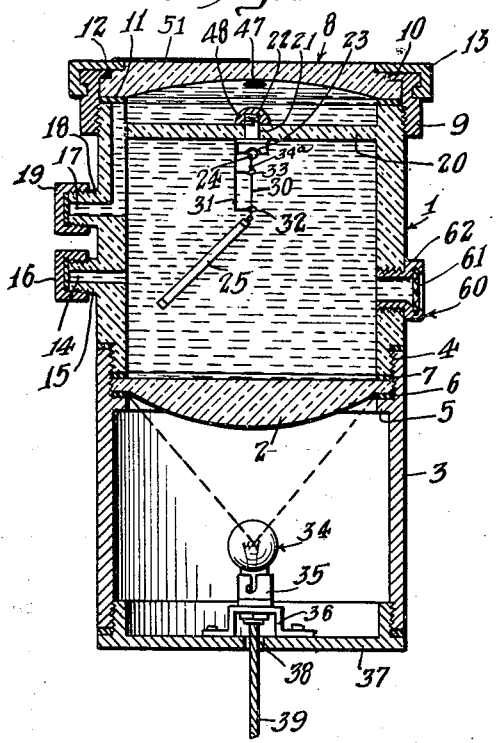
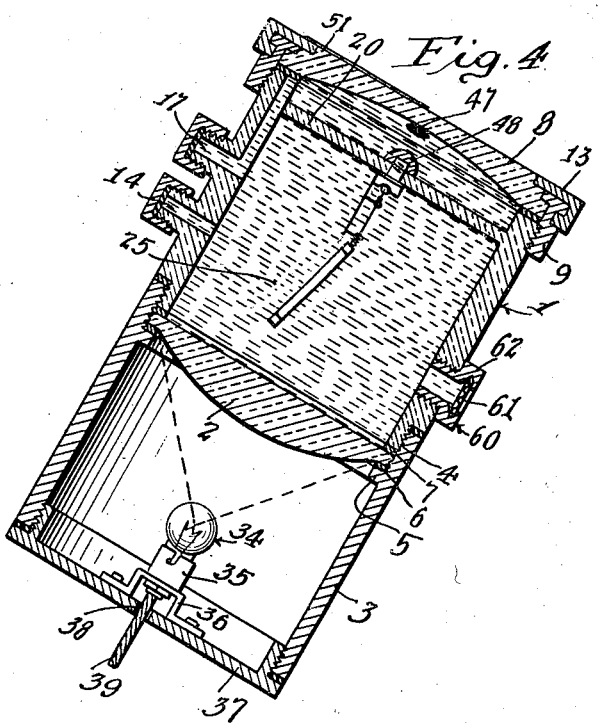
Inventor
Edwin J. Grant
By Lyon & Lyon
Attorneys Oct. 22, 1935.  E. J. GRANT  2,017,900
COMBINATION MAGNETIC COMPASS AND LEVEL INDICATOR
Filed July 6, 1932  2 Sheets-Sheet 2

Inventor
Edwin J. Grant
By Lyon & Lyon
Attorneys

Patented Oct. 22, 1935

2,017,900

UNITED STATES PATENT OFFICE 2,017,900

COMBINATION MAGNETIC COMPASS AND LEVEL INDICATOR

Edwin J. Grant, Los Angeles, Calif.

Application July 6, 1932, Serial No. 321,011

16 Claims. (Cl. 33—223)

My invention relates to direction finding devices and has particular reference to a device for determining direction and conditions of flight in aircraft.

In connection with aviation purposes, the magnetic compass of ordinary construction has been found to be unsatisfactory especially in what is known as blind flying, due to the various angles the airplane forms with respect to ground level during normal flight.

For example, when the airplane is making a turn, it is necessary to bank the airplane, that is, to angle the airplane relative to the horizontal. While so doing, the angle at which the bearings of the usual compass are placed with respect to the magnetic north and to the force of gravity as modified by the centrifugal force causes the needle to reverse or to bind upon its bearings, preventing it from effectively following the magnetic north as the airplane changes its position.

It is therefore an object of my invention to provide a compass which will be actuated by the earth's magnetic lines of force and which will accurately follow these lines of force relative to the airplane independent of any movement of the airplane.

Another object of my invention is to provide a magnetic compass, the needle of which is so suspended as to require no bearings or mechanical pivots and so eliminate their friction and mass momentum and consequent loss of efficiency.

Another object of my invention is to provide a means which will permit reading of the direction of such a needle relative to a graduated measuring scale without mechanical attachments to the needle which would decrease its efficiency.

Another object of my invention is to combine in a single instrument a magnetic compass with a level indicator in which a simultaneous reading of direction relative to the magnetic north and the level of the airplane when traveling horizontally may be made and which would indicate any slipping movement in a bank.

Another object of my invention is to provide a bank indicator which will advise the pilot of the angle of bank of the airplane.

The foregoing and other objects will be apparent from a study of the following specification read in connection with the accompanying drawings, in which:

Fig. 1 is a top plan view of a compass constructed in accordance with my invention.

Fig. 2 is a vertical sectional view taken through the compass shown in Fig. 1.

Fig. 3 is a top plan view of the compass shown in Figs. 1 and 2, turned at an angle such as would be described by the compass mounted upon an airplane making a bank of small inclination.

Fig. 4 is a sectional view similar to Fig. 2 showing the compass and its parts when in the angle of bank illustrated in Fig. 3.

Figure 5:
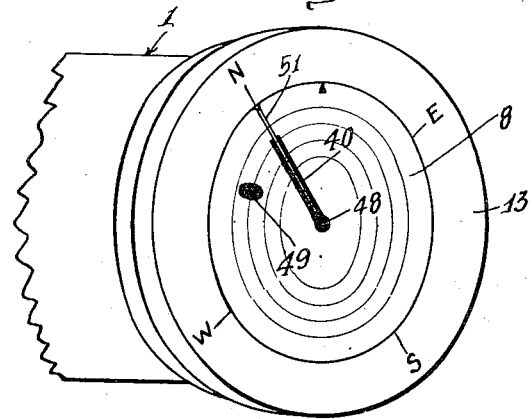
Fig. 5 is a top plan view of the compass shown in Figs. 1 and 2 when the compass is angled with respect to the vertical during normal straight-away flight but with the plane tilted with respect to the horizontal.

Referring to the drawings, I have illustrated my compass as comprising a tubular container 1, preferably formed of some liquid-tight material. The tubular housing member 1 is illustrated as having its bottom closed by means of a convex lens 2 held in place by means of a tubular extension 3 screwed to the lower end of the tubular housing 1 as is indicated at 4, the tubular extension being preferably formed with an inwardly extending flange 5 bearing against the lower side of the lens 2. It will be understood that suitable packing washers 6 and 7 may be interposed between the lens 2 and the adjacent edges of the tubular housing and the flange 5 to insure a liquid-tight seal at the base of the tubular housing 1.

The upper end of the tubular housing 1 is illustrated as being closed by a transparent or translucent plate 8 which is secured to the upper end of the housing 1 by means of a threaded ring 9 and having an inturned flange 10 engaging the upper side of the plate 8 to press the same into tight engagement with the upper edge of the tubular housing 1. Again, suitable packing gaskets 11 or the like may be employed for the purpose of forming a liquid-tight seal at the upper end of the housing 1. If desired, this plate 8 may be a concave lens, level at the top and with a concave face in contact with the liquid inside the upper part of the container and with its upper face made translucent as by frosting or fine grinding of glass.

Also, if desired, the upper surface of the plate 8 may be provided with a suitable radial recess 12 which permits the ring 9 to be counter-sunk relative to the plate and thus permit a calibrated outer ring 13 to be mounted upon the ring 9 in such position that the ring 13 contacts with the main body of the upper surface of the plate 8 and can be rotated with respect to the container. This ring 13 may have upon its circumference a graduated scale showing the different points of the compass, as shown in Fig. 1, and inserted into the ring 13 may be a circular transparent plate with a radial line 51 marked on it from its center to the north point on circumference of the ring 13.

The housing 1, with its bottom closure formed by the lens 2, and its upper closure formed by the plate 8, constitutes a relatively large chamber adapted to be filled with any suitable liquid which may be suitably admitted to the interior of the housing 1 through a filler opening 14 formed upon an extending boss 15, which may constitute an integral part of the material of which the housing 1 is made. The outer end of the filler opening 14 may be closed by a suitable cap 16 threaded upon the boss 15 to seal the filler opening against escape of liquids.

In order to insure that the housing 1 may be completely filled with liquid, I prefer to provide an air exit 17 which may also be formed through an extending boss 18 provided with a cap or closure 19, the inner end of the air exit opening 17 communicating with a slot formed in the side wall of the housing 1 and extending upwardly to communicate with the uppermost portion of the chamber formed in the housing 1. Thus while liquid is introduced through the filler opening 14, air is permitted to escape through the air exit until the entire chamber within the housing 1 is filled with liquid. If desired, an expansion adjustment device may be provided as is indicated at 60 as comprising a thin resilient plate 61 secured in a bushing 62 screwed into the walls of the housing 1.

By referring particularly to Figs. 1 and 2, it will be observed that the housing 1 is provided with a shelf 20 which extends laterally across the interior of the housing, the shelf being preferably formed as a relatively narrow band of transparent material, either formed integrally with the walls of the housing 1 or formed separately and suitably secured within the housing. The shelf 20 is provided with a central aperture 21 located in the vertical axis of the housing 1 through which a stud 22 may pass, constituting a centering device for a compass needle anchor. The stud 22 is illustrated as being provided upon its lower surface with a semispherical recess 23 in which a spherical anchor 24 is adapted to seat. The anchor is preferably formed of material having a specific gravity slightly less than the specific gravity of the liquid employed to fill the housing 1, so that the anchor 24 is constantly pressed upwardly into its seat 23 by the hydrostatic pressure exerted by the liquid.

A compass needle 25 is provided which is preferably formed of some material or materials so selected or designed as to have a specific gravity substantially equal to the specific gravity of the liquid employed to fill the housing 1.

Figure 7:
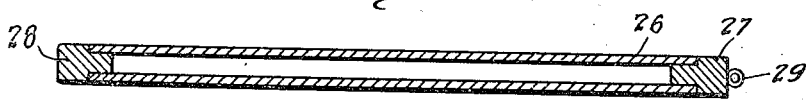
Fig. 7 is a detailed sectional view of a compass needle which may be employed with the compass shown in Figs. 1 to 5.

By referring particularly to Fig. 7, it will be observed that one construction of a compass needle of this character may be effected by forming a hollow elongated tubular member 26 from steel or similar magnetic material sealed at either end by end pieces 27 and 28. The walls of the tube 26 are relatively thin so as to have a minimum mass. The tube is balanced in weight both as to its longitudinal axis and an axis at right angles to the longitudinal axis through the center point of the tube. The interior of the tube may be exhausted or filled with air or other gas in such quantities as to give the assembled structure the desired specific gravity. Thus the compass needle 25 will float freely in any position in the body of the liquid while immersed therein except insofar as it is affected by the force exerted by the magnetic lines of force of the earth.

At the south seeking end of the compass needle 25, a suitable securing device 29 may be provided, such as an eye, to which an anchor connection device 30 may be secured, the preferred anchor connection constituting a relatively fine thread formed of silk or similar material, one end of which is attached to the eye 29 (see Fig. 7) while the other end is attached to the eye at the bottom of the anchor 24. Thus the compass needle will be suspended in the liquid contained in the housing in such manner that the needle must always assume a position in alignment with the lines of the earth's magnetic field, acting both as a compass and as a magnetic dip indicator. In other words, the thread anchor connection employed permits the needle to freely move universally. In the above description and that following, it is assumed that the compass described is to be used in the northern hemisphere. When used in the southern hemisphere, the dip will be towards the south and the needle should be secured to its anchorage at its north seeking pole.

I prefer to make the anchor connection 30 relatively long so that if the compass is rotated several times with respect to the north, the normal amount of twist permitted in a thread will be sufficient to prevent any rotational force to be exerted upon the needle 25. It is desirable to provide a guide for normally holding the lower end of the anchor connection thread 30 in direct alignment with the central axis of the housing 1 and for this purpose I provide a wire guide 31 to which may be secured a pair of rings 32 and 33 through which the thread may pass, the lowermost ring 32 being preferably so located as to be immediately above the point of attachment of the thread 30 with the eye of the needle. Thus, one end of the needle is constantly maintained in the vertical axis of the housing 1. One method of mounting the wire guide 31 comprises soldering or brazing of the upper end of the wire to the anchor connection stud 21.

By employing a transparent plate 8 and by forming the shelf 20 also of transparent material, the position of the needle 25 may be read directly through the plate 8. By calibrating the ring 13, as is indicated in Fig. 1, the direction of the needle with respect to any of the calibrations may be read.

The instrument may be most accurately read by employing a semi-translucent or semi-transparent plate 8 and by mounting a suitable light source 34 in the extension 3 as by employing an electric lamp attached to a socket 35 mounted upon a suitable support 36, which is in turn secured to an end closure plate 37, the end closure plate being provided with a suitable aperture 38 through which current conductors 39 may pass to supply electric current to the lamp 34. By suitably selecting the focal length of the convex lens 2, the light rays from the source 34 may be projected upwardly through the liquid in the housing 1 with the rays traveling parallel to the vertical axis of the housing. Thus, the needle 25 will cause a shadow, such as is indicated at 40 in Fig. 1, upon the upper surface of plate 8 and this shadow may be read with respect to the compass points and the calibrations upon the ring 13 to determine the angular position of the needle. In this connection, a "lubber's point" may be indicated as by forming a mark 41 upon the upper surface of the transparent plate 8. Hence, if the compass is so mounted in an airplane or other vehicle that a line drawn through the center of the plate 8 and through the lubber's point mark 41 aligns with the longitudinal axis of the airplane, the angle formed between this line and the line of shadow made by the compass needle will at all times indicate the direction in which the airplane is traveling with respect to the magnetic north pole.

Thus if it is desired to travel in a northeasterly direction, the ring 13 may be rotated upon its ring 9 until the northeast point on ring 13 is aligned with the lubber's point 41. The airplane is then steered in a direction so that the shadow 40 cast by the compass needle 25 aligns with the north point upon the ring 13 and its radial line 51. By keeping the shadow so aligned, the pilot will be following exactly the desired direction of flight.

Thus the compass may be used as an ordinary magnetic compass to determine the direction of flight for a desired course and, when so used, it has extraordinary freedom from vibration and an extraordinary low "period". The "period" of a compass is the time required to return to stabilized north-pointing position, when removed from same, and is one of the most important factors aimed at by airplane compass manufacturers. The period of this compass is less than one-half of any pivoted compass now manufactured.

As an airplane is maneuvered, turns are made during which the airplane is ordinarily banked so that in changing direction, the compass needle will follow the shifting of the magnetic north relative to the direction of flight of the airplane. It is a well known phenomenon that when an airplane is banked in a turn, the centrifugal force due to the turning movement of the plane will modify the normal force of gravity so that any indicator which depends for its operation upon pivots or bearings is frequently frozen until after the turn is negotiated and the airplane again straightened out on a new course.

However, this compass is freed from the effect of gravity and centrifugal forces by the suspension of the balanced needle alone, free from bearing or pivot friction and mass, in a liquid of the same specific gravity as the needle and free to move in any direction either horizontally or vertically.

Hence, during the entire movement no matter what the angle of bank of the airplane may be, the compass needle will point in the direction of the magnetic north so that by watching the shadow of the needle or semi-transparent plate 8, the pilot may always determine the direction in which his plane is heading.

My compass may also be employed for the purpose of permitting the pilot to measure the angle of bank since it will be observed that when the airplane is in a steep bank towards the north or south, the container will be positioned angularly relative to the vertical different from that when the airplane is traveling in a straight line and at the same time the compass needle will maintain substantially its original position with respect to the vertical. Thus the shadow which is thrown upon the transparent plate will be foreshortened or lengthened at these points by an amount proportional to the angle of the airplane in making a banked turn.

I have illustrated the plate 8 as having a number of faint lines 42 concentric with the vertical axis of the housing 1 so that the shadow which is cast by the needle may be compared with the lines 42 and thus the sharpness of the bank may be measured.

It will be observed that the mounting of the compass needle upon the thread 30 permits considerable rotation of the casing relative to the needle in following maneuvers of the airplane without placing any turning stress upon the needle 25. Again, the fact that the anchorage 23 is one of floating against the spherical recess and the stud 22 is such that if a turning stress is placed upon the thread, the anchorage may readily slip relative to its seat to relieve such stress.

Figure 6:
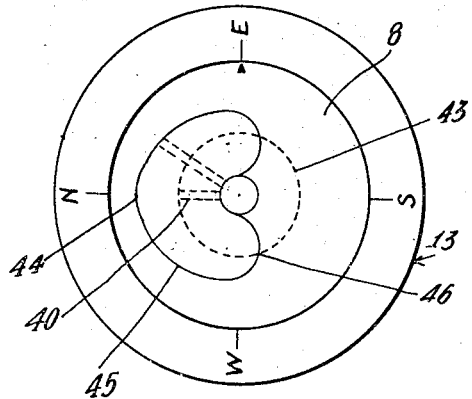
Fig. 6 is a diagrammatic view showing the path of travel of the compass needle during a banking operation of the airplane.

In Fig. 6 I have illustrated diagrammatically the outline described by the shadow of the compass needle when the airplane is banked in making a complete 360° turn. For example, assuming that the airplane is originally traveling in an easterly direction, if a turn could be made without banking, the shadow 40 of the compass needle would describe a circle, indicated by the dotted line 43, the length of the shadow remaining substantially constant during the entire turning movement.

However, if the airplane is turned with a sharp bank for an entire circle, starting, after banking, from the easterly direction to the north, the initial position of the shadow would be a point indicated at 44 for the easterly direction while, as the plane turns toward the north, the shadow will swing around and will be shortened along a path indicated by the fine line 45. Now assuming that the airplane, continuing its sharp bank after passing its headed-north direction, turns toward the west, the banking movement will place the vertical axis of the housing 1 at a point to the left of the outer or free end of the compass needle 25 so that the shadow which is cast by the needle will for an instant be pointing south, as is indicated at the point 46, although the compass needle will actually be pointing exactly toward the north magnetic pole. When the airplane passes beyond its headed-west direction and turns toward the south, the axis of the housing will again be moved to the right relative to the point of the needle and the shadow cast by the compass needle will be again towards the earth's north horizon on the transparent plate in the circle 43.

This reversal in the projection of the position of the compass needle is the condition which effectively prevents the employment of a compass needle mounted on a pivot or in bearings, since once the vertical axis of the mounting has moved beyond the angle of the north magnetic dip, a compass with such a mounting tends to reverse itself, requiring that the entire needle mounting shall rotate through a large angle in order to bring the needle back to its true north-indicating position, its momentum and friction making this movement entirely unreliable.

However, with the mounting of the compass needle at one of its ends instead of with bearings at its mid point, the compass needle is free to swing back to the opposite side of the axis of the housing without requiring any axial rotational movement and as soon as the airplane is leveled out, the shadow cast by the compass needle is accurately pointed in the horizontal magnetic north direction; and during the banking movement itself, the compass can be depended upon for the compass direction.

While the lengthening or foreshortening of the shadow cast by the compass needle may be employed to indicate the level condition of the airplane with respect to a north horizontal axis, I may provide an additional level-indicating device which may comprise a bubble or float 47 floated upon the surface of the liquid contained in the housing 1 so that when the housing is in a vertical position, the bubble 47 will be in the exact center of the concave lens at the lower side of the semi-transparent plate 8. By preferably forming the bubble of some material which will cast a shadow, this shadow will be in vertical alignment with the nut 43 which is employed to hold the stud 21 in position. Hence a shadow such as that indicated at 49 in Fig. 1 will be in the exact geometrical center of the plate 8 as long as the airplane is horizontal and traveling a straight course. However, should the airplane be nosed down or nosed up or one of the wings dipped, the shifting of the vertical axis of the housing 1 from the true vertical will cause the shadow 49 cast by the bubble to change its position relative to the center of the plate 8, as is indicated in Fig. 5. Therefore the pilot may always determine the angle of dive or lift of the airplane and may also determine whether or not the wings of the airplane are maintained level during straight-ahead flight.

Also in banking, the position of the level bubble will enable the pilot to determine the position of the airplane with respect to the direction of the force of gravity as modified by the centrifugal force, any slippage or up or down movement being capable of detection.

The particular materials and construction of the compass needle 25 may vary to suit the selected liquid employed in the housing 1. I prefer to employ a mixture of glycerine and water as the filling liquid for the housing. All parts except the needle should be made of non-magnetic materials. The bubble or float may be made of some liquid which will be immiscible with and will float on the liquid in the casing, or preferably the bubble or float is made of some solid material such as wood, cork or rubber or other material and filled with air or with a liquid lighter than the liquid in the vessel. When a hollow rubber ball is used, such ball is preferably only partially filled.

In view of the projection of the compass position by means of light rays, my compass will operate just as successfully in an inverted position as in the position illustrated herein. This can be seen by turning the figures of the compass upside-down and noting that only the shelf need be reversed with respect to the casing and in such position the compass could be read from beneath with accuracy equal in all respects to that when the compass is in the position shown in the drawings. In case the position is reversed as above, a bubble heavier than that in the container should be used, such as carbon tetrachloride.

It will be understood by those skilled in the art that various changes in materials and construction may be made and I do not desire to be limited to any of the details shown or described herein except as defined in the appended claims.

I claim:

1. In a compass, a magnetic needle, a support, and a flexible member securing one end of said needle to said support for free universal movement relative to said support.

2. In a compass, a casing having a translucent cover, a liquid in said casing, a support in said casing, a compass needle having a specific gravity relative to said liquid to permit said needle to freely float immersed in said liquid, and means securing one end of said needle to said support for free universal movement relative to said support.

3. In a compass, a casing having one transparent end and one translucent end, a liquid in said casing, a support in said casing, a compass needle having a specific gravity relative to said liquid to permit said needle to freely float immersed in said liquid, means for securing one end of said compass needle to said support for free universal movement relative to said support, and means for projecting light through said casing to cause said needle to project a shadow on the translucent end corresponding to the position of the needle relative to the azimuth.

4. In a compass, a casing having a translucent end, a liquid in said casing, a compass needle having a specific gravity relative to the liquid to permit the needle to freely float immersed in said liquid, means suspending said needle in said casing from one end of said needle with that end of the needle aligned with the vertical axis of said casing, a lubber's point associated with said translucent top and spaced from the vertical axis of said casing, and means mounting said casing upon a vehicle so that a line drawn between said vertical axis and said lubber's point is aligned with the longitudinal axis of said vehicle, whereby the angular position of the vertical projection of said compass needle relative to said line indicates the course of travel of said vehicle.

5. In a compass, a casing, a support in said casing, a liquid in said casing, a compass needle having a specific gravity relative to the liquid to permit the needle to freely float immersed in said liquid, a thread secured to one end of said needle, an anchor secured to said thread, and means for supporting said anchor on said support for rotational movement relative to said support.

6. In a compass, a casing, a support in said casing, a liquid in said casing, a compass needle having a specific gravity relative to the liquid to permit the needle to freely float immersed in said liquid, a thread one end of which is secured to one end of said needle and the other end of which is secured to said support in the vertical axis of said casing, and a guide engaging said thread to support the same in alignment with the vertical axis of said casing.

7. In a compass, a casing, a translucent top for said casing, a liquid in said casing, a magnetic compass needle having a specific gravity relative to the liquid permitting the needle to float freely immersed in said liquid, means attaching one end of said needle to said casing in the vertical axis of said casing, a float floating on said liquid, and means normally centering said float in the vertical axis of said casing whereby movement of said casing from the vertical will cause displacement of said bubble relative to the center of said top to permit comparison between the position of said float and the position of said needle.

8. In a compass, a casing provided with a vertical axis, a compass needle suspended in said casing, a translucent plate in said casing on which the position of the needle may be read, means for projecting the shadow of the needle on said plate, a lubber's point associated with said plate and aligned such that a line drawn between the vertical axis of said casing and said lubber's point is aligned with the longitudinal axis of a vehicle on which said compass is used, a calibrated ring surrounding said translucent plate and movable with reference to said plate, and means associated with said ring and said plate forming a marker, whereby shifting said ring to parallel the marker with the projected shadow of said needle indicates the angle of direction of the vehicle with respect to the magnetic north.

9. In a compass, a housing, a liquid in said housing, a support in said housing, a magnetic needle, and a flexible member securing one end of said needle to said support for free universal movement relative to said support.

10. In a compass, the combination of a stationary housing provided with a translucent cover, a liquid in said housing, a support in said housing, an elongated compass needle, a flexible member securing one end of said needle to said support, for universal movement of said needle within said housing, and means for projecting horizontal and vertical directional components of said compass needle upon said housing cover.

11. In a compass, the combination of a stationary housing provided with a translucent cover, a liquid in said housing, an elongated compass needle mounted by one end for universal movement within said housing and in said liquid, and means for projecting horizontal and vertical directional components of said compass needle upon said housing cover.

12. In a compass, the combination of a casing of light-transmitting material, a liquid in said casing, a support substantially in the vertical axis of the casing, an elongated magnetic needle, a flexible member securing one end of said needle to said support for free universal movement of the needle relative to said support, and means for passing light through said casing in the direction of the vertical axis thereof.

13. A compass of the character defined in claim 12 including a member adapted to receive a shadow of the magnetic needle, and a rotatable ring surrounding said member, said ring being radially graduated.

14. A compass of the character defined in claim 12 including a member adapted to receive a shadow of the magnetic needle, a lubber's point carried by said member, a plurality of lines concentric with the axis of the housing inscribed upon said member, and a radially graduated revolvable ring surrounding said member.

15. In a compass, the combination of a casing, a liquid in said casing, an elongated magnetic needle in said liquid, and means attached to one end of said needle and suspending said needle in said liquid whereby said needle may move in horizontal and vertical planes to indicate direction and dip.

16. A compass of the character described in claim 15 in which the needle has a specific gravity relative to said liquid sufficient to equal the force of gravity on said needle when said needle is immersed in said liquid.

EDWIN J. GRANT.